United States Patent [19]

Rapp et al.

[11] 4,192,856

[45] Mar. 11, 1980

[54] MANUFACTURE OF HYDROXYLAMMONIUM SALTS

[75] Inventors: Güenther Rapp, Ludwigshafen; Erwin Thomas, Freinsheim; Dieter Wolf, Gruenstadt; Heribert Küerten, Neustadt; Peter Zehner, Ludwigshafen, all of Fed. Rep. of Germany

[73] Assignee: BASF Aktiengesellschaft, Fed. Rep. of Germany

[21] Appl. No.: 932,636

[22] Filed: Aug. 10, 1978

[30] Foreign Application Priority Data

Aug. 16, 1977 [DE] Fed. Rep. of Germany ....... 2736872

[51] Int. Cl.² ............................................. C01B 21/14
[52] U.S. Cl. .................................................... 423/387
[58] Field of Search ................ 423/385, 387, 388, 395

[56] References Cited

U.S. PATENT DOCUMENTS

| | | | |
|---|---|---|---|
| 2,414,142 | 1/1947 | Dreyfus | 423/387 |
| 2,823,101 | 2/1958 | Jockers et al. | 423/387 |
| 3,295,925 | 1/1967 | Fueg et al. | 423/387 |
| 3,484,214 | 12/1969 | Gehring | 423/387 X |
| 3,954,946 | 5/1976 | Graf et al. | 423/387 |
| 3,956,469 | 5/1976 | El-Ghatta et al. | 423/387 |

FOREIGN PATENT DOCUMENTS

| | | |
|---|---|---|
| 1193923 | 6/1965 | Fed. Rep. of Germany . |
| 1542219 | 1/1973 | Fed. Rep. of Germany . |
| 2447972 | 4/1976 | Fed. Rep. of Germany . |
| 6908934 | 12/1970 | Netherlands . |

*Primary Examiner*—Earl C. Thomas
*Attorney, Agent, or Firm*—Keil & Witherspoon

[57] ABSTRACT

Hydroxylammonium salts are manufactured by a process comprising the catalytic reduction of nitric oxide with hydrogen in a dilute aqueous solution of a mineral acid in the presence of a suspended platinum catalyst at an elevated temperature, wherein the reaction mixture is recycled and the gas mixture, containing nitric oxide and hydrogen, present in the gas space above the reaction zone, is introduced, by means of one or more downwardly directed jets of liquid, consisting of the recycled reaction mixture and issuing from a nozzle orifice, into one or more circulation zones which are present in the reaction zone, are open at both sides, extend in the direction of the entering jet of liquid and are completely covered by the reaction mixture, the reaction mixture leaving the bottom of the circulation zone and containing unconverted gases is deflected, passed upwards in the annular zone externally surrounding the circulation zone, and at the same time reaction mixture of low gas content is recycled from a separation zone located under the reaction zone.

6 Claims, 1 Drawing Figure

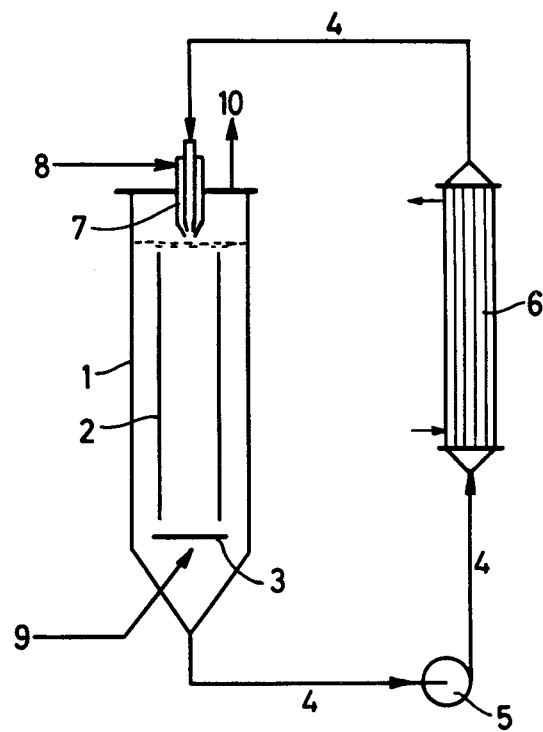

MANUFACTURE OF HYDROXYLAMMONIUM SALTS

The present invention relates to a process for the manufacture of hydroxylammonium salts by catalytically reducing nitric oxide with hydrogen in a dilute aqueous solution of a mineral acid in the presence of a suspended platinum catalyst at an elevated temperature, wherein the reaction mixture is recycled.

The manufacture of hydroxylammonium salts by reducing nitric oxide with hydrogen in a dilute mineral acid in the presence of a platinum-containing catalyst is carried out in stirred vessels, as described, for example, in German Published Application DAS 2,447,972. This gives space-time yields of up to 0.43 mole of nitric oxide converted per liter of liquid reaction mixture in the reaction zone per hour. In industrial operation, the disadvantages of the stirred vessels result from their construction. With increasing size of the stirred vessel, leak-tightness of the gland through which the stirrer shaft passes becomes increasingly difficult to achieve. The vessel and lid must be of a substantially more expensive construction, so as to be able to withstand the load of the stirrer gearbox and motor and the rotational forces of the stirrer. In addition, the mounting of the apparatus must be strengthened in order to be able to absorb the vibrations of the entire system. This means that in industrial operation the problems are very expensive to solve. Hence the objective is to achieve a very high space-time yield with a small reaction volume and if possible without using any stirring equipment.

For example, German Published Application DAS 1,193,923 describes a method in which the reaction is carried out in a perforated tray column, the reaction solution being continuously recycled by pumping. According to the process disclosed in the published documents of Netherlands Patent Application No. 69/08,934, a reaction procedure based on the air-lift pump principle is employed. In addition, German Laid-Open Application DOS 1,542,219 discloses a method in which intimate mixing of gas, liquid and solid is effected by nozzles and the dispersion is introduced tangentially into the reaction zone. The above procedures require further improvement in respect of the achievable space-time yield of nitric oxide converted.

It is an object of the invention to increase the space-time yield of nitric oxide converted, in the synthesis of hydroxylammonium salts by catalytic reduction of nitric oxide with hydrogen, at the particular pressure used, and at the same time to avoid the above disadvantages.

We have found that this object is achieved by providing a process for the manufacture of hydroxylammonium salts by catalytically reducing nitric oxide with hydrogen in a dilute aqueous solution of a mineral acid in the presence of a suspended platinum catalyst at an elevated temperature, with recycling of the reaction mixture, wherein the gas mixture, containing nitric oxide and hydrogen, present in the gas space above the reaction zone, is introduced, by means of one or more downwardly directed jets of liquid, consisting of the recycled reaction mixture and issuing from a nozzle orifice, into one or more circulation zones which are present in the reaction zone, are open at both sides, extend in the direction of the entering jet of liquid and are completely covered by the reaction solution, the reaction mixture leaving the bottom of the circulation zone and containing unconverted gases is deflected, passed upwards in the annular zone externally surrounding the circulation zone, and at the same time reaction mixture of low gas content is recycled from a separation zone located under the reaction zone.

The novel process has the advantage that, at each particular pressure used, better space-time yields, based on nitric oxide converted are achieved. This means that in existing equipment of a particular size higher throughputs are achieved, or that for a given throughput smaller equipment can be used. Further, the novel process has the advantage that it is simple to scale up.

As a rule, a molar ratio of hydrogen:nitric oxide greater than 1, preferably of from 1.5:1 to 6:1, is maintained. Particularly good results are achieved by maintaining a molar ratio of hydrogen:nitric oxide of 3.5–5:1 in the reaction zone.

In general, a strong mineral acid, eg. hydrochloric acid, nitric acid, sulfuric acid or phosphoric acid, is used. Acid salts of these, eg. ammonium bisulfate, may also be used. The use of sulfuric acid is particularly preferred. As a rule, aqueous acids which initially are from 4 N to 6 N are used and in the course of the reaction the acid concentration is not allowed to fall below 0.2 N.

The reaction is preferably carried out at from 30° to 80° C., more particularly from 40° to 60° C. The reaction in general takes place under atmospheric pressure but it has proved advantageous to effect the reaction under super-atmospheric pressure, eg. at up to 300 bar.

The platinum catalyst used is advantageously a supported catalyst; carbon carriers have proved particularly suitable. Platinum-graphite supported catalysts have acquired particular importance industrially; such catalysts advantageously contain from 0.3 to 5% by weight of platinum. The supported catalyst is in a finely divided state, so that it forms a suspension in the reaction medium. Advantageously, the catalyst additionally contains one or more elements of main group 5 and/or 6 of the periodic table, having an atomic weight of $>31$, as well as lead and/or mercury as a catalyst poison. Suitable catalysts and their manufacture are described, for example, in German Pat. Nos. 1,088,037, 920,963, 956,038 and 945,752. As a rule, from 1 to 400 g of supported platinum catalyst are used per liter of aqueous mineral acid. The gas mixture, containing hydrogen and nitric oxide and present in the gas space above the reaction zone, is introduced by means of one or more downwardly directed jets of liquid issuing from a nozzle orifice and consisting of recycled reaction mixture, which essentially comprises aqueous mineral acid and catalyst, with or without previously formed hydroxylammonium salts and any by-products, as well as dissolved and/or finely divided gases, into one or more circulation zones which are present in the reaction zone, are open at both sides, extends in the direction of the entering jet of liquid and are completely covered by the aqueous reaction mixture. In addition to hydrogen and nitric oxide the gas mixture may also contain gases formed as by-products, eg. $N_2O$, as well as inert gases.

It is possible to introduce one or a plurality, eg. three, jets of liquid into one circulation zone. On the other hand, as the reaction zones become larger it is advantageous to use more than one circulation zone, for example a central circulation zone which is surrounded by six further circulation zones. At least one jet of liquid is then downwardly directed into each of the circulation zones. In the simplest case, the circulation zone is a tube introduced vertically and centrally into the reaction zone. The circulation zone or zones are open at both sides and extend in the direction of the entering jet or jets of liquid. The circulation zone is also completely covered by the reaction mixture. As a rule, the height:diameter ratio of the reaction zone is 2–30:1, preferably 5–15:1. The ratio of the diameter of the circulation zone to the diameter of the reaction zone is as a rule from about 0.7 to 0.1 and is preferably about 0.5.

The velocity of the jet of liquid introduced is advantageously from 5 to 40 m/sec, preferably from 10 to 30 m/sec. The amount of recycled reaction solution is as a rule from 10 to 500, especially from 100 to 400, $m^3/m^3$ of the reaction zone per hour. The velocity of the liquid in the circulation zone should advantageously be from 1 to 6, preferably from 2 to 4, times as great as in the annular zone surrounding the circulation zone. In this way, the gas content in the circulation zone and in the annular zone becomes about the same, and the differences in density become small.

The distance of the nozzle orifice from the upper end of the circulation zone is advantageously from 0.1 to 3, preferably from 0.3 to 0.9, times the diameter of the circulation zone.

The reaction mixture issuing from the bottom of the circulation zone, and the gas mixture which has not yet been consumed on arrival at that point, are deflected by means of a deflector plate located transversely below the circulation zone. Advantageously, the distance of the plate from the lower end of the circulation zone is from 0.1 to 1.0, preferably from 0.2 to 0.7, times the diameter of the circulation zone. Unconsumed gas mixture and a part of the liquid rise in the annular zone which surrounds the circulation zone. The jet of liquid entering from above causes the liquid reaction mixture once again to move downwards in the circulation zone and at the same time the gas mixture present above the liquid level is introduced into the circulation zone, and finely dispersed, by the downwardly directed jet of liquid.

The gas introduced into the liquid from the gas phase above the liquid level is automatically regulated, according to the invention, by immersion of the mouth of the nozzle into the liquid; this means that when the liquid level is lower, more gas is introduced, until the liquid level rises, and conversely, if the liquid level is above the nozzle mouth less gas is introduced so that the liquid level falls. In this way, the content of finely dispersed gas bubbles in the reaction mixture can also be regulated in a simple manner. Advantageously, this is done by starting the circulation and then lowering the level of liquid in the reaction zone by draining. The process of introduction then takes place until the liquid level has reached the nozzle orifice. The rise in the liquid level is not due to an increased feed of liquid reaction mixture, but due to increased gas uptake, the gas being finely dispersed in the liquid. Advantageously the gas hold-up in the liquid reaction mixture in the reaction zone is from 5 to 50%, based on liquid reaction mixture. The fresh gas can be introduced not only from the gas phase above the reaction zone but additionally at the point where the reaction mixture is deflected, advantageously below the deflector plate. In addition, gas mixture can also be fed into the annular space surrounding the circulation zone.

Furthermore, it has proved advantageous to maintain, in the reaction zone, an energy density of from 1 to 50, especially from 5 to 30, $kW/m^3$ of liquid reaction mixture present in the said zone. This energy is introduced into the reaction mixture by the jets of liquid. The energy density is a function of the amount circulated and of the pressure drop at the nozzle orifice.

Immediately below the reaction zone there is a separation zone in which entrained gas bubbles separate out from the liquid reaction mixture. The bubbles migrate upwards counter to the flow of liquid, whilst the liquid reaction mixture is drawn off and recycled to the nozzle orifice or orifices.

Accordingly, the process of the invention employs a jet drive system, with the nozzle working downwardly. The drive jet introduces the energy for the circulation in the reactor. Since the nozzle mouth is on the surface of the liquid, the drive jet carries gas into the liquid and this gas becomes very finely dispersed in the circulation tube. As a result, the slip between liquid and gas is very slight and a high rate of circulation results.

The greater part of the gas bubbles rising in the annular zone is carried by the stream of liquid into the circulation zone. Under steady state conditions, the drive jet therefore only introduces sufficient gas that the liquid level reaches to the nozzle orifice. This also limits the gas content in the liquid, and this content can never become so great that there is a danger that the circulation of the stream of gas and liquid in the reactor may break down due to the formation of large bubbles. Accordingly, the advantage of the process of the invention resides in the uniform dispersion of gas and of the suspended catalyst throughout the reaction zone. When the reactor is stopped, the nozzle orifice cannot become clogged by catalyst which has settled out.

The process may be operated continuously or batchwise. In the former case, the aqueous mineral acid to be reacted, which may or may not be mixed with hydroxylamine salts, is steadily introduced into the reaction zone. The reaction product is steadily withdrawn from the outer liquid circulation. To compensate for catalyst withdrawn with the reaction liquid, appropriate amounts of catalyst are added to the liquid feed. The desired gas hold-up can be obtained by varying the liquid feed or liquid take-off. The gas hold-up may be measured by, for example, determining the apparent density of the liquid/solid/gas mixture or determining the amount of liquid in the reaction chamber.

Hydroxylammonium salts are used to manufacture cyclohexanone-oxime, a caprolactam intermediate.

The drawing sets forth schematically apparatus that can be used in carrying out the present invention.

The Examples which follow illustrate the invention.

EXAMPLES 4.3 N sulfuric acid and 40 g, per liter of sulfuric acid, of a platinum-graphite catalyst containing 0.5% by weight of Pt are introduced into an immersed jet apparatus as shown in the drawing, comprising a reactor (1) with circulation tube (2) and baffle plate (3) and an outer liquid circulation (4) with pump (5) and heat exchanger (6) for r moving the heat of reaction, as well as an immersed jet nozzle (7), gas feed (8, 9) and gas outlet (10).

After starting up the circulation, sufficient reaction medium is taken off the reactor to give the desired gas hold-up. The circulated suspension is released into the reactor through the immersed jet nozzle.

After displacing the air with $H_2$, a gas mixture consisting of 36% by volume of NO and 63% by volume of $H_2$ (the remainder being inert gas) is introduced into the reactor. The off-gas is measured and analyzed. When the sulfuric acid in the reaction solution has almost been consumed, the reaction is terminated, the catalyst is separated from the hydroxylamine solution and the amount of hydroxylamine formed is determined.

|  | Example 1 | Example 2 |
|---|---|---|
| Reaction chamber | 40 | 21.5 liters |
| Amount of liquid drained off | 15 | 8.5 liters |
| Liquid in the reaction chamber | 25 | 12 liters |
| Amount of $H_2SO_4$ in total system | 45 | 26.5 liters |
| Gas hold-up | 37.5 | 39.5% |
| Amount circulated | 5.0 | 7.8 $m^3/h$ |
| Pressure drop at the nozzle orifice | 2.0 | 1.4 bar |
| Power density | 11 | 23.5 $KW/m^3$ of liquid in the reaction zone |
| Point of introduction of the gas | Nozzle orifice | Baffle plate |
| Reaction time | 10.0 | 7.5 hours |
| Final concentration of the solution | 0.6 | 0.7 N $H_2SO_4$ |
| Amount of NO converted | 4037 | 2327 liters (S.T.P.) |
| Amount of $NH_2OH$ produced | 4950 | 2756 g |
| Space-time yield | 0.72 | 1.1 mole of NO converted per hour per liter of liquid in the reaction chamber |
| Yield of $NH_2OH$ based on NO converted | 83.3 | 80.4% |

We claim:

1. In a process for the manufacture of hydroxylammonium salts wherein nitric oxide is reduced with hydrogen in a dilute aqueous solution of a mineral acid at elevated temperatures in the presence of a suspended platinum catalyst and wherein the reaction mixture is recycled, the improvement which comprises:

maintaining a gaseous mixture of nitric oxide and hydrogen above a reaction zone containing liquid reaction mixture; introducing the gas mixture into the liquid reaction mixture by passing at least one jet of recycled liquid reaction mixture through said gas mixture and into at least one circulation zone containing liquid reaction mixture whereby said gases are finely distributed in the reaction mixture; deflecting the jet of reaction mixture and unconverted gases upwardly in an annular zone surrounding the circulation zone; and recycling reaction mixture of low gas content to the circulation zone from a separation zone located under the reaction zone.

2. The process of claim 1, wherein nitric oxide and hydrogen are fed to the nozzle orifice.

3. The process of claim 1, wherein nitric oxide and hydrogen are fed to a point just below the point at which the reaction mixture, issuing from the circulation zone, is deflected.

4. The process of claim 1, wherein the reaction mixture in the reaction zone contains from 5 to 50% by volume of gas.

5. The process of claim 1, wherein an energy density of from 1 to 50 $kW/m^3$ of liquid reaction mixture in the reaction zone is maintained in the said zone.

6. A process as set forth in claim 1 wherein the velocity of the liquid in the circulation zone is from 2 to 4 times as great as in the annular zone surrounding the circulation zone.

* * * * *